US012732601B2

(12) United States Patent
Liu et al.

(10) Patent No.: US 12,732,601 B2
(45) Date of Patent: Sep. 8, 2026

(54) MULTI-VIEW SINGLE-FRAME PHASE DEMODULATION METHOD BASED ON STRUCTURED LIGHT FIELD AND RELATED COMPONENTS

(71) Applicant: Shenzhen University, Shenzhen (CN)

(72) Inventors: Xiaoli Liu, Shenzhen (CN); Quanyao Hou, Shenzhen (CN); Yang Yang, Shenzhen (CN); Qijian Tang, Shenzhen (CN); Xiang Peng, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 693 days.

(21) Appl. No.: 18/198,898

(22) Filed: May 18, 2023

(65) Prior Publication Data

US 2023/0379446 A1 Nov. 23, 2023

(30) Foreign Application Priority Data

May 23, 2022 (CN) ........................ 202210562804.5

(51) Int. Cl.

| | |
|---|---|
| ***G06V 10/82*** | (2022.01) |
| ***G01B 11/25*** | (2006.01) |
| ***G06T 3/40*** | (2006.01) |
| ***G06T 15/00*** | (2011.01) |
| ***H04N 13/351*** | (2018.01) |

(52) U.S. Cl.
CPC ......... *H04N 13/351* (2018.05); *G01B 11/254* (2013.01); *G06T 3/40* (2013.01); *G06T 15/00* (2013.01); *G06V 10/82* (2022.01)

(58) Field of Classification Search
CPC .... H04N 13/351; G06V 10/82; G01B 11/254; G06T 3/40; G06T 15/00
See application file for complete search history.

(56) References Cited

U.S. PATENT DOCUMENTS

| | | | | |
|---|---|---|---|---|
| 10,580,131 | B2 * | 3/2020 | Mazo | G06N 3/08 |
| 2018/0373200 | A1 * | 12/2018 | Shi | G03H 1/02 |
| 2019/0388194 | A1 * | 12/2019 | Atiya | A61C 9/006 |
| 2022/0203700 | A1 * | 6/2022 | Chen | B05B 12/084 |
| 2023/0122985 | A1 * | 4/2023 | Feng | G06N 3/0464 706/21 |
| 2023/0306675 | A1 * | 9/2023 | Huang | G06T 15/06 |

* cited by examiner

*Primary Examiner* — Beau D Spratt
(74) *Attorney, Agent, or Firm* — Li & Cai Intellectual Property Office

(57) ABSTRACT

The present disclosure provides a multi-view single-frame phase demodulation method based on a structured light field and related components. The method includes: constructing an LFDNet neural network; collecting a data set by a structured light field system and training the LFDNet neural network to optimize the LFDNet neural network; and inputting a multi-view fringe image to be predicted into the optimized LFDNet neural network, outputting numerators and denominators of multiple views, and calculating the numerators and denominators of the multiple views via an arc tangent function and obtaining wrapped phases of multiple views. The present disclosure combines deep learning with the characteristics of multi-view imaging of the structured light field system, utilizes a neural network to learn a mapping relation from the multi-view fringe image to the numerators and denominators, and has the advantage of implementing single-frame high-precision phase demodulation of multiple views of a light field through one prediction.

8 Claims, 3 Drawing Sheets

S401

Divide the data set into a training set, a validation set, and a test set

S402

Train the LFDNet neural network by utilizing the training set, and predict in a training process by utilizing the validation set and calculate a predicted result error to optimize the LFDNet neural network

S403

Predict the optimized LFDNet neural network by utilizing the test set and calculate the predicted result error to validate a network effect and the accuracy of the phase demodulation method

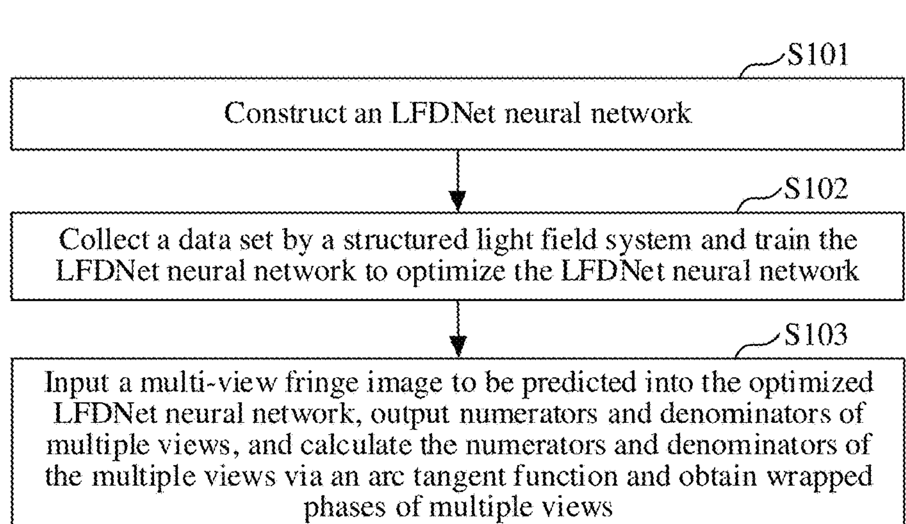

Acquire a tensor feature H × W × V of a multi-view fringe image and use same as an input tensor of an LFDNet neural network, where H represents a tensor height, W represents a tensor width, and V represents the number of tensor channels

S202

Perform a plurality of times of convolution processing, downsampling processing, and upsampling processing on the input tensor to obtain an output tensor H × W × 2V of the LFDNet neural network

Measure S different scenes by the structured light field system, and perform 12-step phase shift fringe projection on each scene and collect to obtain a 12-step phase shift fringe image

S302

Calculate a numerator and a denominator of the 12-step phase shift fringe image of each view in each scene

S303

Splice the numerator Nu with the denominator De in channel dimension to obtain an output tensor H × W × 2V, so as to obtain data of each scene

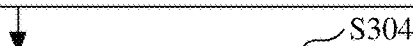

S304

Obtain a data set based on the measured S different scenes

FIG. 3

MULTI-VIEW SINGLE-FRAME PHASE DEMODULATION METHOD BASED ON STRUCTURED LIGHT FIELD AND RELATED COMPONENTS

CROSS REFERENCE TO RELATED APPLICATIONS

The present application claims the benefit of Chinese Patent Application No. 202210562804.5 filed on May 23, 2022, the contents of which are incorporated herein by reference in their entirety.

TECHNICAL FIELD

The present disclosure relates to the technical field of light field imaging, and in particular to a multi-view single-frame phase demodulation method based on a structured light field and related components.

BACKGROUND

Light field imaging can record the intensity information and direction information of light at the same time through single-frame exposure, and has the ability to calculate and invert a three-dimensional shape of a scene.

A passive estimation technique for the depth of a light field does not need to project active illumination, but only needs single exposure imaging on the scene performed by a light field imaging system, so that the depth information of the scene can be recovered from light field data by utilizing an algorithm. The technique has the advantages of flexibility, high efficiency, and applicability to dynamic scenes, but has the disadvantages of low accuracy and poor stability. With respect to these disadvantages, researchers have introduced a phase encoding technique for structured light into the light field imaging to implement active light field imaging, which can greatly improve the accuracy of estimating the depth of the light field.

Active structured light field imaging performs phase encoding on a space and recovers phase information modulated by the depth of the scene from a collected fringe image through calculation. This process needs to perform phase demodulation on the collected fringe image; a Fourier transform method is commonly adopted in the prior art to perform single-frame fringe phase demodulation; and the method obtains a wrapped phase by performing Fourier transform, windowed filtering, and inverse Fourier transform on the fringe image and belongs to a spatial phase demodulation method.

In addition, the researchers have developed a single-frame fringe phase demodulation method based on deep learning for common cameras. However, such method is only limited to perform single-frame demodulation on a single view, and has low demodulation efficiency for light field cameras with the characteristics of multi-view imaging.

SUMMARY

The present disclosure is intended to provide a multi-view single-frame phase demodulation method based on a structured light field and related components, which aims to solve the problem that an existing single-frame fringe phase demodulation method based on deep learning has low efficiency in single-frame demodulation with multi-view imaging.

In a first aspect, an embodiment of the present disclosure provides a multi-view single-frame phase demodulation method based on a structured light field, including:

constructing an LFDNet neural network;

collecting a data set by a structured light field system and training the LFDNet neural network to optimize the LFDNet neural network; and inputting a multi-view fringe image to be predicted into the optimized LFDNet neural network, outputting numerators and denominators of multiple views, and calculating the numerators and denominators of the multiple views via an arc tangent function and obtaining wrapped phases of multiple views.

In a second aspect, an embodiment of the present disclosure provides a computer device, including a memory, a processor, and a computer program stored in the memory and capable of running on the processor, where when executing the computer program, the processor implements the multi-view single-frame phase demodulation method based on a structured light field according to the first aspect.

In a third aspect, an embodiment of the present disclosure provides a computer-readable storage medium, where the computer-readable storage medium stores a computer program and when executed by a processor, the computer program causes the processor to perform the multi-view single-frame phase demodulation method based on a structured light field according to the first aspect.

The embodiments of the present disclosure disclose a multi-view single-frame phase demodulation method based on a structured light field and related components. The method includes: constructing an LFDNet neural network; collecting a data set by a structured light field system and training the LFDNet neural network to optimize the LFDNet neural network; and inputting a multi-view fringe image to be predicted into the optimized LFDNet neural network, outputting numerators and denominators of multiple views, and calculating the numerators and denominators of the multiple views via an arc tangent function and obtaining wrapped phases of multiple views. The embodiments of the present disclosure combine the deep learning with the characteristics of multi-view imaging of the structured light field system, utilize a neural network to learn a mapping relation from the multi-view fringe image to the numerators and denominators, and have the advantage of implementing single-frame high-precision phase demodulation of multiple views of a light field through one prediction.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other accompanying drawings from these accompanying drawings without creative efforts.

FIG. 1 is a schematic flowchart of a multi-view single-frame phase demodulation method based on a structured light field provided by an embodiment of the present disclosure.

FIG. 2 is a schematic sub-flowchart of a multi-view single-frame phase demodulation method based on a structured light field provided by an embodiment of the present disclosure.

FIG. 3 is yet another schematic sub-flowchart of a multi-view single-frame phase demodulation method based on a structured light field provided by an embodiment of the present disclosure.

DETAILED DESCRIPTION

Figure 4:
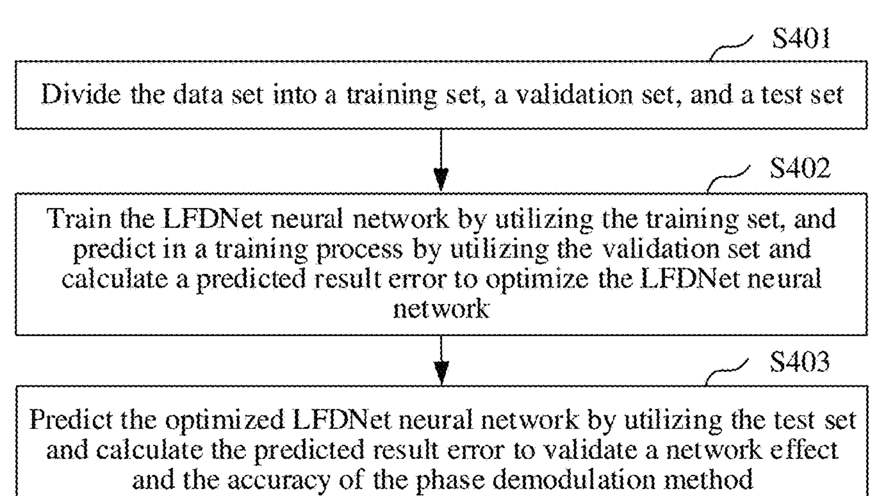
FIG. 4 is still another schematic sub-flowchart of a multi-view single-frame phase demodulation method based on a structured light field provided by an embodiment of the present disclosure.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the disclosed embodiments without creative efforts shall fall within the protection scope of the present disclosure.

With reference to FIG. 1, FIG. 1 is a schematic flowchart of a multi-view single-frame phase demodulation method based on a structured light field provided by an embodiment of the present disclosure.

As shown in FIG. 1, the method includes steps S101 to S103.

S101: An LFDNet neural network is constructed.

S102: A data set is collected by a structured light field system and the LFDNet neural network is trained to optimize the LFDNet neural network.

In this step, the LFDNet neural network is optimized by the data set to improve the accuracy of network prediction.

S103: A multi-view fringe image to be predicted is inputted into the optimized LFDNet neural network, numerators and denominators of multiple views are outputted, and the numerators and denominators of the multiple views are calculated via an arc tangent function and wrapped phases of multiple views are obtained.

In this step, based on the optimized LFDNet neural network, high-precision wrapped phases of multiple views can be obtained by calculating the outputted numerators and denominators of views via the arc tangent function.

This embodiment combines the deep learning with the characteristics of multi-view imaging of the structured light field system, utilizes a neural network to learn a mapping relation from the multi-view fringe image to the numerators and denominators, and has the advantage of implementing single-frame high-precision phase demodulation of multiple views of a light field through one prediction. At the same time, comparison by experiment shows that the demodulation error of the phase demodulation method provided by the present disclosure is reduced by 70% compared with that of a Fourier transform method adopted in the prior art, and the efficiency is improved by V times compared with that of a single-frame fringe phase demodulation method based on deep learning used for common cameras, where V is the number of light field views to be demodulated.

In one embodiment, as shown in FIG. 2, step S101 includes:

S201: A tensor feature H×W×V of a multi-view fringe image is acquired and used as an input tensor of an LFDNet neural network, where H represents a tensor height, W represents a tensor width, and V represents the number of tensor channels.

S202: A plurality of times of convolution processing, downsampling processing, and upsampling processing are performed on the input tensor to obtain an output tensor H×W×2V of the LFDNet neural network.

This embodiment takes the tensor feature H×W×V of the multi-view fringe image, obtained from the light field as an input to output the output tensor H×W×2V, and the output corresponds to respective numerators and denominators of V input views.

Figure 5:
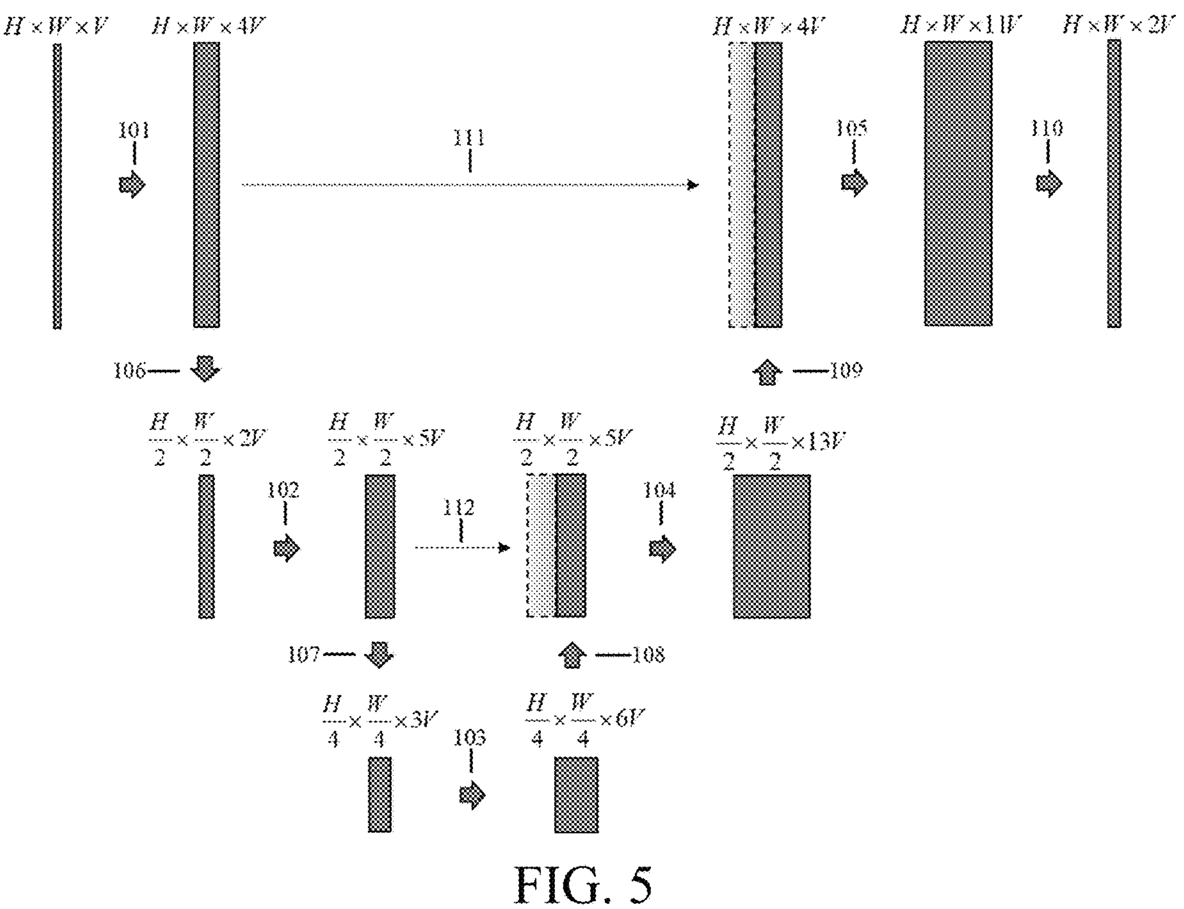
FIG. 5 is a schematic block diagram of an LFDNet neural network provided by an embodiment of the present disclosure.

Specifically, as shown in FIG. 5, a specific process for the plurality of times of convolution processing, downsampling processing, and upsampling processing in step S202 includes:

Convolution processing is performed on the input tensor by a first dense convolution block 101 to obtain a feature tensor H×W×4V.

Downsampling processing is performed on the feature tensor H×W×4V by a first downsampling block 106 to obtain a feature tensor $$\frac{H}{2}\times\frac{W}{2}\times 2V.$$

Convolution processing is performed on the feature tensor $$\frac{H}{2}\times\frac{W}{2}\times 2V$$

by a second dense convolution block 102 to obtain a feature tensor $$\frac{H}{2}\times\frac{W}{2}\times 5V.$$

Downsampling processing is performed on the feature tensor $$\frac{H}{2}\times\frac{W}{2}\times 5V$$

by a second downsampling block 107 to obtain a feature tensor $$\frac{H}{4}\times\frac{W}{4}\times 3V.$$

Convolution processing is performed on the feature tensor $$\frac{H}{4}\times\frac{W}{4}\times 3V$$

by a third dense convolution block 103 to obtain a feature tensor $$\frac{H}{4}\times\frac{W}{4}\times 6V.$$

Upsampling processing is performed on the feature tensor $$\frac{H}{4}\times\frac{W}{4}\times 6V$$

by a first upsampling block 108 to obtain a feature tensor $$\frac{H}{2}\times\frac{W}{2}\times 5V.$$

The feature tensor $$\frac{H}{2}\times\frac{W}{2}\times 5V$$

outputted by the first upsampling block is spliced with the feature tensor $$\frac{H}{2}\times\frac{W}{2}\times 5V$$

outputted by the second dense convolution block in channel dimension through a first switching connection 112 to obtain a first spliced tensor.

Convolution processing is performed on the first spliced tensor by a fourth dense convolution block 104 to obtain a feature tensor $$\frac{H}{2}\times\frac{W}{2}\times 13V.$$

Upsampling processing is performed on the feature tensor $$\frac{H}{2}\times\frac{W}{2}\times 13V$$

by a second upsampling block 109 to obtain a feature tensor H×W×4V.

The feature tensor H×W×4V outputted by the second upsampling block is spliced with the feature tensor H×W×4V outputted by the first dense convolution block in channel dimension through a second switching connection 111 to obtain a second spliced tensor.

Convolution processing is performed on the second spliced tensor by a fifth dense convolution block 105 to obtain a feature tensor H×W×11V.

Convolution processing is performed on the feature tensor H×W×11V by an output convolution block 110 to obtain an output tensor H×W×2V of the LFDNet neural network, where the output tensor corresponds to respective numerators and denominators of V multi-view fringe images.

In the LFDNet neural network proposed in this embodiment, details of adopted modules are as follows:

In the dense convolution block, the input tensor passes through the three convolution blocks in sequence, and the input of each convolution block is obtained by splicing the output of all layers in front of this dense convolution block with the input of the dense convolution block.

In the downsampling block, the number of feature channels of the input tensor is changed to 4V via 1×1 convolution, and the resolution ratio of the feature tensor is reduced to one half via 3×3 convolution with the step length of 2.

In the upsampling block, the number of feature channels of the input tensor is changed to 4V via 1×1 convolution, and the resolution ratio of the feature tensor is doubled via 3×3 transposed convolution with the step length of 2.

In the output convolution block, the input is subjected to 3×3 convolution after being continuously subjected to both 1×1 convolution and 3×3 convolution to obtain the output.

In one embodiment, as shown in FIG. 3, the collecting a data set by a structured light field system in step S102 includes:

S301: S different scenes are measured by the structured light field system, and 12-step phase shift fringe projection is performed on each scene and a 12-step phase shift fringe image is collected to obtain.

In this step, the structured light field system includes a projector engine and a light field camera; a single fringe image is projected to a scene to be detected by the projector engine; and deformed fringes in the scene to be detected are collected by the light field camera to obtain the 12-step phase shift fringe images of multiple views.

S302: A numerator and a denominator of the 12-step phase shift fringe image of each view in each scene are calculated according to the following formula:

$$Nu=\sum\nolimits_{n=1}^{N}(I_n\sin\delta_n);$$
$$De=\sum\nolimits_{n=1}^{N}(I_n\cos\delta_n),$$

where Nu represents the numerator, De represents the denominator, N is the number of steps of phase shift, $I_n$ is a phase shift fringe image, and $\delta_n$ represents a phase shift amount.

In this step, N, $I_n$ and $\delta_n$ are substituted into the above calculating formula for calculating to obtain the numerator and denominator of the 12-step phase shift fringe image of each view in each scene.

S303: The numerator Nu is spliced with the denominator De in channel dimension to obtain an output tensor H×W×2V, so as to obtain data of each scene, which can be represented as $$\{I\rightarrow Nu,\ De\}.$$

S304: A data set $\{I^s\rightarrow Nu^s, De^s|s=1, 2, \ldots, S\}$ is obtained based on the measured S different scenes.

This embodiment collects the data set of the S different scenes by the structured light field system to perform optimization training on the LFDNet neural network.

As shown in FIG. 4, the specific optimization training may include:

S401: The data set is divided into a training set, a validation set, and a test set.

S402: The LFDNet neural network is trained by utilizing the training set, and predicted in a training process by utilizing the validation set and a predicted result error is calculated to optimize the LFDNet neural network.

S403: The optimized LFDNet neural network is predicted by utilizing the test set and the predicted result error is calculated to validate a network effect and the accuracy of the phase demodulation method.

On the basis of the training of S401 to S403, the LFDNet neural network with high-accuracy predicted results is obtained.

In one embodiment, step S103 includes:

Wrapped phases of multiple views are calculated according to the following formula:

$$\varphi_v = -a\tan\left(\frac{Nu_v}{De_v}\right),\ v = 1, 2, \ldots V,$$

where a tan( ) represents an arc tangent function and v represents the number of views.

In this embodiment, a multi-view fringe image to be predicted is inputted into the optimized LFDNet neural network and is predicted by the LFDNet neural network to obtain an output tensor H×W×2V; the first V channels in the tensor are numerators $\{Nu_v, v=1, 2, \ldots V\}$ of V views and the last V channels in the tensor are denominators $\{De_v, v=1, 2, \ldots V\}$ of the V views; and the obtained numerators $Nu_v$ and denominators $De_v$ are substituted into the above calculating formula for calculating via the arc tangent function to obtain the wrapped phases of multiple views.

Figure 6:
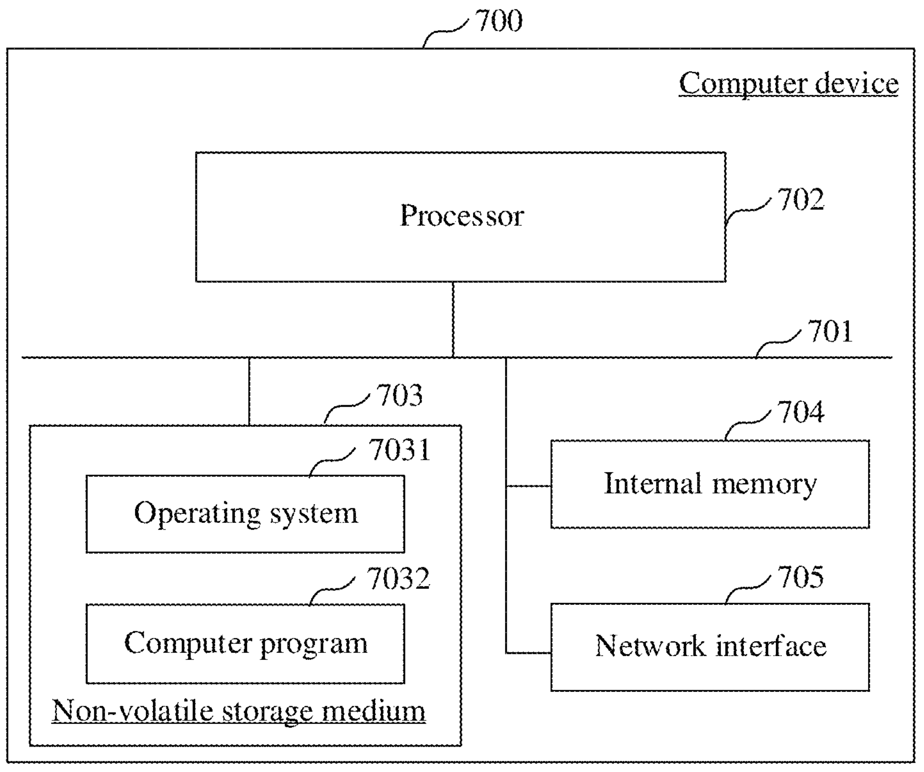
FIG. 6 is a schematic block diagram of a computer device provided by an embodiment of the present disclosure.

The above multi-view single-frame phase demodulation device based on a structured light field may be implemented in the form of a computer program, and the computer program may be run on a computer device as shown in FIG. 6.

With reference to FIG. 6, FIG. 6 is a schematic block diagram of a computer device provided by an embodiment of the present disclosure. The computer device 700 is a server, and the server may be an independent server and may also be a server cluster composed of a plurality of servers.

With reference to FIG. 6, the computer device 700 includes a processor 702, a memory, and a network interface 705, which are connected through a system bus 701, where the memory may include a non-volatile storage medium 703 and an internal memory 704.

The non-volatile storage medium 703 may store an operating system 7031 and a computer program 7032. When executed, the computer program 7032 may cause the processor 702 to perform the multi-view single-frame phase demodulation method based on a structured light field.

The processor 702 is configured to provide computing and control capabilities to support the operation of the whole computer device 700.

The internal memory 704 provides an environment for the running of the computer program 7032 in the non-volatile storage medium 703; and when executed by the processor 702, the computer program 7032 may cause the processor 702 to perform the multi-view single-frame phase demodulation method based on a structured light field.

The network interface 705 is configured to perform network communication, such as providing transmission of data information. A person skilled in the art may understand that the structure shown in FIG. 6 is only a block diagram of a part of the structure related to the solution of the present disclosure and does not constitute a limitation on the computer device 700 to which the solution of the present disclosure is applied. Specifically, the computer device 700 may include more or less parts than that shown in the figures, combine some parts, or have different part arrangements.

A person skilled in the art may understand that the embodiments of the computer device shown in FIG. 6 do not constitute a limitation on a specific constitution of the computer device. In other embodiments, the computer device may include more or less parts than that shown in the figures, combine some parts, or have different part arrangements. For example, in some embodiments, the computer device may only include the memory and the processor; and in such embodiments, the structures and functions of the memory and the processor are the same as those in the embodiment shown in FIG. 6, and details are not described herein again.

It should be understood that in the embodiments of the present disclosure, the processor 702 may be a central processing unit (CPU), and the processor 702 may also be another general-purpose processor, a digital signal processor (DSP), an application specific integrated circuit (ASIC), a field-programmable gate array (FPGA) or another programmable logic device, a discrete gate, a transistor logic device, a discrete hardware component, etc. Among them, the general-purpose processor may be a microprocessor, or the processor may also be any conventional processor, or the like.

Another embodiment of the present disclosure provides a computer-readable storage medium. The computer-readable storage medium may be a non-volatile computer-readable storage medium. The computer-readable storage medium stores a computer program, where when the computer program is executed by a processor, the multi-view single-frame phase demodulation method based on a structured light field provided by an embodiment of the present disclosure is implemented.

The storage medium is a tangible, non-transient storage medium, for example, may be various tangible storage media that can store program codes, such as a USB flash drive, a removable hard disk, a read-only memory (ROM), a magnetic disk, or an optical disc.

The foregoing descriptions are merely specific implementations of the present disclosure, but are not intended to limit the protection scope of the present disclosure. Any equivalent modification or replacement readily figured out by a person skilled in the art within the technical scope disclosed in the present disclosure shall fall within the protection scope of the present disclosure. Therefore, the protection scope of the present disclosure should be subject to the protection scope of the claims.

What is claimed is:

1. A multi-view single-frame phase demodulation method using a processor and based on a structured light field, comprising:

constructing an LFDNet neural network;

collecting a data set by a structured light field system and training the LFDNet neural network to optimize the LFDNet neural network; and inputting a multi-view fringe image to be predicted into the optimized LFDNet neural network, to generate numerators and denominators of multiple views, and transforming the numerators and denominators of the multiple views via an arc tangent function and obtaining wrapped phases of multiple views;

wherein the collecting a data set by a structured light field system comprises:

measuring S different scenes by the structured light field system, and performing 12-step phase shift fringe projection on each scene and collecting to obtain a 12-step phase shift fringe image; and calculating the 12-step phase shift fringe image of each view in each scene according to the following formula:

$$Nu=\sum_{n=1}^{N}(I_n \sin\delta_n);$$

$$De=\sum_{n=1}^{N}(I_n \cos\delta_n),$$

where Nu represents the numerator, De represents the denominator, N is the number of steps of phase shift, $I_n$ is a phase shift fringe image, and $\delta_n$ represents a phase shift amount;

splicing the numerator Nu with the denominator De in channel dimension to obtain an output tensor H×W×2V, so as to obtain data of each scene, which can be represented as {I→Nu, De}; and obtaining a data set $\{I^s \rightarrow Nu^s, De^s | s=1, 2, \ldots, S\}$ based on the measured S different scenes.

2. The multi-view single-frame phase demodulation method using a processor and based on a structured light field according to claim 1, wherein the constructing an LFDNet neural network comprises:

acquiring a tensor feature H×W×V of a multi-view fringe image and using same as an input tensor of the LFDNet neural network, wherein H represents a tensor height, W represents a tensor width, and V represents the number of tensor channels; and performing a plurality of times of convolution processing, downsampling processing, and upsampling processing on the input tensor to obtain an output tensor H×W×2V of the LFDNet neural network.

3. The multi-view single-frame phase demodulation method using a processor and based on a structured light field according to claim 2, wherein the performing a plurality of times of convolution processing, downsampling processing, and upsampling processing on the input tensor to obtain an output tensor H×W×2V of the LFDNet neural network comprises:

performing convolution processing on the input tensor by a first dense convolution block to obtain a feature tensor H×W×4V;

performing downsampling processing on the feature tensor H×W×4V by a first downsampling block to obtain a feature tensor $$\frac{H}{2}\times\frac{W}{2}\times 2V;$$

performing convolution processing on the feature tensor $$\frac{H}{2}\times\frac{W}{2}\times 2V$$

by a second dense convolution block to obtain a feature tensor $$\frac{H}{2}\times\frac{W}{2}\times 5V;$$

performing downsampling processing on the feature tensor $$\frac{H}{2}\times\frac{W}{2}\times 5V$$

by a second downsampling block to obtain a feature tensor $$\frac{H}{4}\times\frac{W}{4}\times 3V;$$

performing convolution processing on the feature tensor $$\frac{H}{4}\times\frac{W}{4}\times 3V$$

by a third dense convolution block to obtain a feature tensor $$\frac{H}{4}\times\frac{W}{4}\times 6V;$$

performing upsampling processing on the feature tensor $$\frac{H}{4}\times\frac{W}{4}\times 6V$$

by a first upsampling block to obtain a feature tensor $$\frac{H}{2}\times\frac{W}{2}\times 5V;$$

splicing the feature tensor $$\frac{H}{2}\times\frac{W}{2}\times 5V$$

outputted by the first upsampling block with the feature tensor $$\frac{H}{2}\times\frac{W}{2}\times 5V$$

outputted by the second dense convolution block in channel dimension through a first switching connection to obtain a first spliced tensor;

performing convolution processing on the first spliced tensor by a fourth dense convolution block to obtain a feature tensor $$\frac{H}{2}\times\frac{W}{2}\times 13V;$$

performing upsampling processing on the feature tensor $$\frac{H}{2}\times\frac{W}{2}\times 13V$$

by a second upsampling block to obtain a feature tensor H×W×4V;

splicing the feature tensor H×W×4V outputted by the second upsampling block with the feature tensor H×W×4V outputted by the first dense convolution block in channel dimension through a second switching connection to obtain a second spliced tensor;

performing convolution processing on the second spliced tensor by a fifth dense convolution block to obtain a feature tensor H×W×11V; and performing convolution processing on the feature tensor H×W×11V by an output convolution block to obtain an output tensor H×W×2V of the LFDNet neural network, wherein the output tensor corresponds to respective numerators and denominators of V multi-view fringe images.

4. The multi-view single-frame phase demodulation method using a processor and based on a structured light field according to claim 1, wherein the collecting a data set by a structured light field system and training the LFDNet neural network to optimize the LFDNet neural network comprises:

dividing the data set into a training set, a validation set, and a test set;

training the LFDNet neural network by utilizing the training set, and predicting in a training process by utilizing the validation set and calculating a predicted result error to optimize the LFDNet neural network; and predicting the optimized LFDNet neural network by utilizing the test set and calculating the predicted result error to validate a network effect and the accuracy of the phase demodulation method.

5. The multi-view single-frame phase demodulation method using a processor and based on a structured light field according to claim 1, wherein the inputting a multi-view fringe image to be predicted into the optimized LFDNet neural network, outputting numerators and denominators of multiple views, and calculating the numerators and denominators of the multiple views via an arc tangent function and obtaining wrapped phases of multiple views comprises:

calculating wrapped phases of multiple views according to the following formula:

$$\varphi_v = -a\tan\left(\frac{Nu_v}{De_v}\right),\ v = 1, 2, \ldots V,$$

where a tan( ) represents an arc tangent function and v represents the number of views.

6. The multi-view single-frame phase demodulation method using a processor and based on a structured light field according to claim 1, wherein the measuring S different scenes by the structured light field system, and performing 12-step phase shift fringe projection on each scene and collecting to obtain a 12-step phase shift fringe image comprises:

projecting a single fringe image to a scene to be detected by a projector engine in the structured light field system; and collecting deformed fringes in the scene to be detected by a light field camera in the structured light field system to obtain the 12-step phase shift fringe images of multiple views.

7. A computer device, comprising a memory, a processor, and a computer program stored in the memory and capable of running on the processor, wherein when executing the computer program, the processor implements the multi-view single-frame phase demodulation method based on a structured light field according to claim 1.

8. A computer-readable non-transient storage medium, wherein the computer-readable storage medium stores a computer program; and when executed by a processor, the computer program causes the processor to perform the multi-view single-frame phase demodulation method based on a structured light field according to claim 1.

* * * * *